April 9, 1940.  W. A. RUSH  2,196,341
TRAVELING BAG FOR AUTOMOBILES
Original Filed May 20, 1935   5 Sheets-Sheet 1
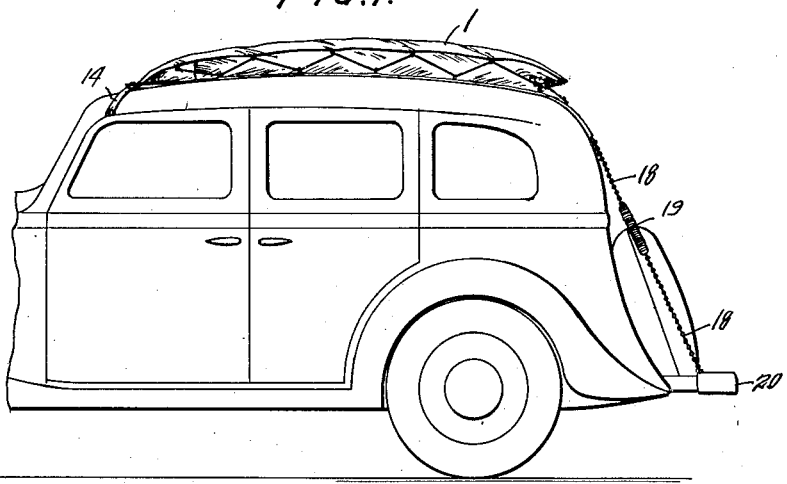
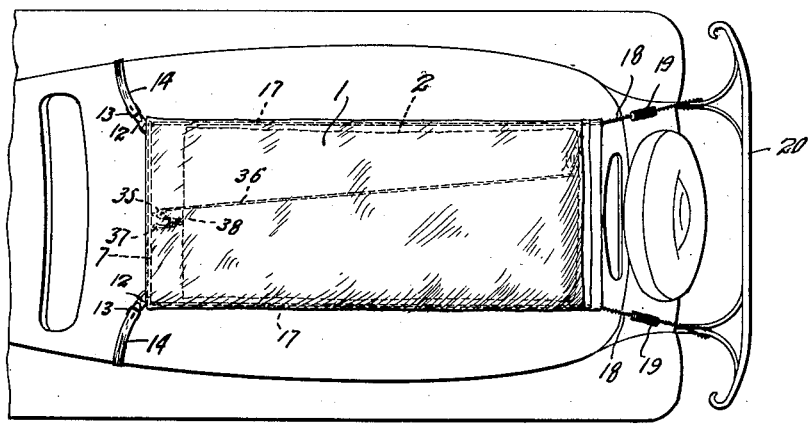
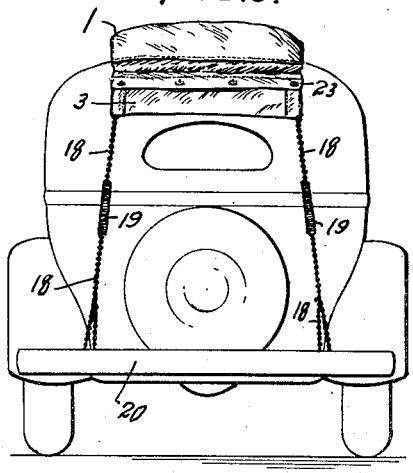
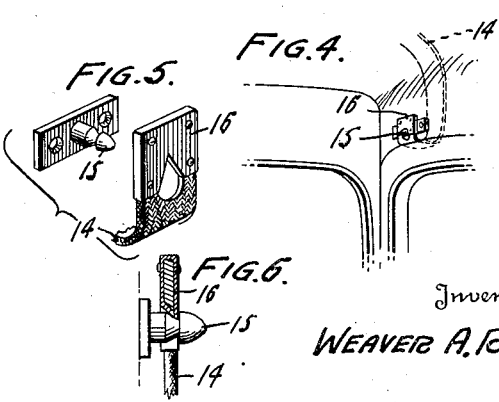
Inventor
WEAVER A. RUSH
By Semmes & Semmes
Attorneys

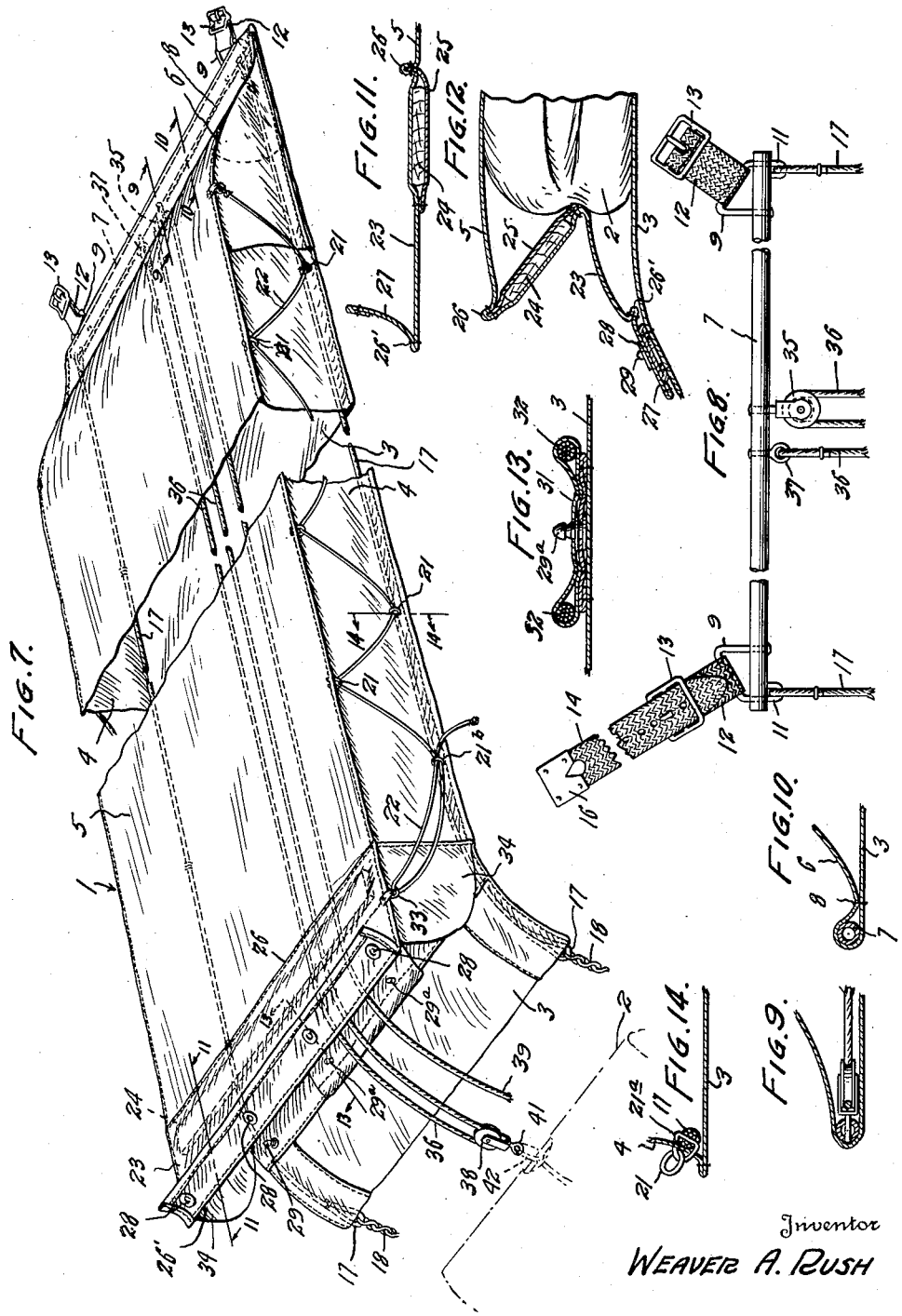

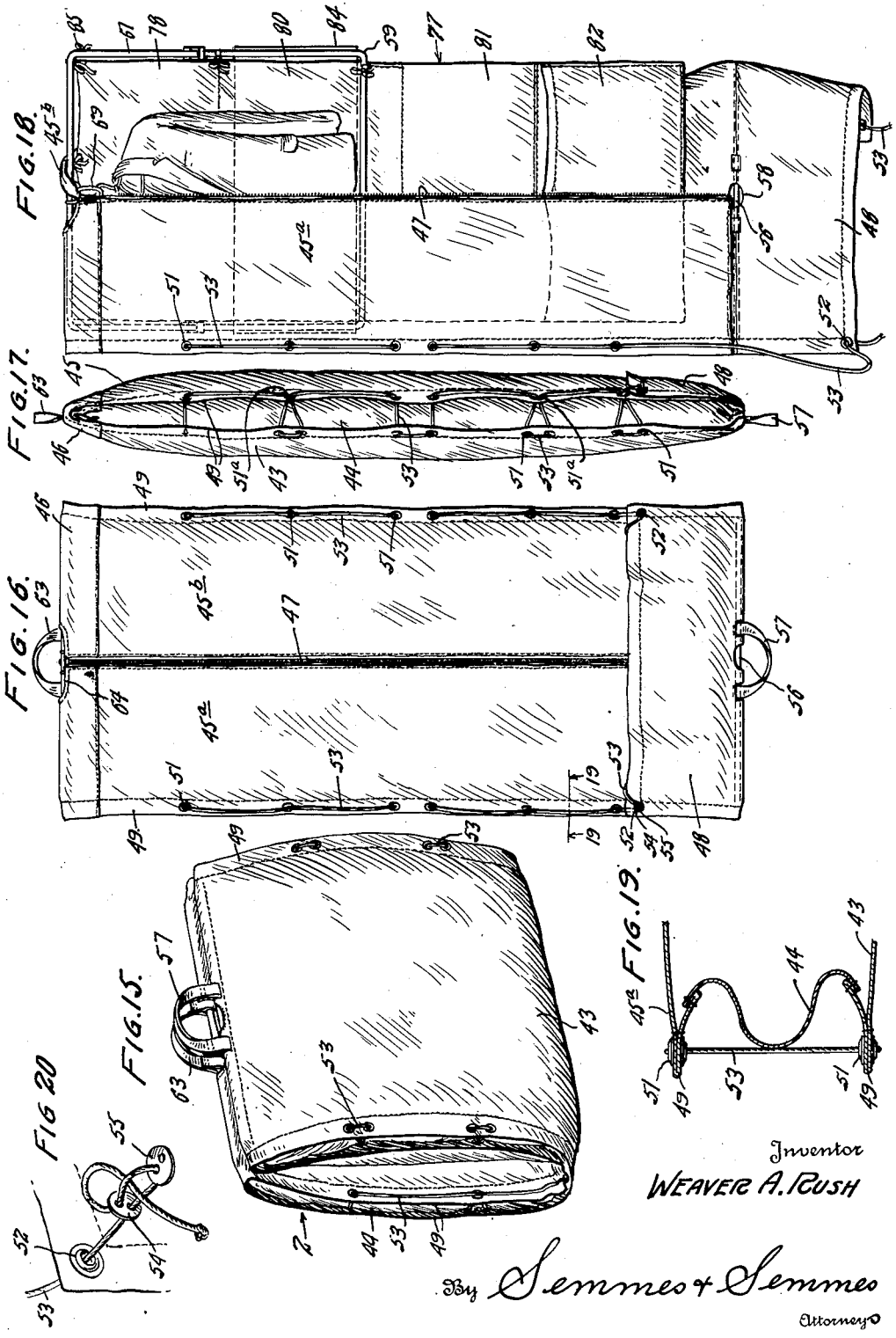

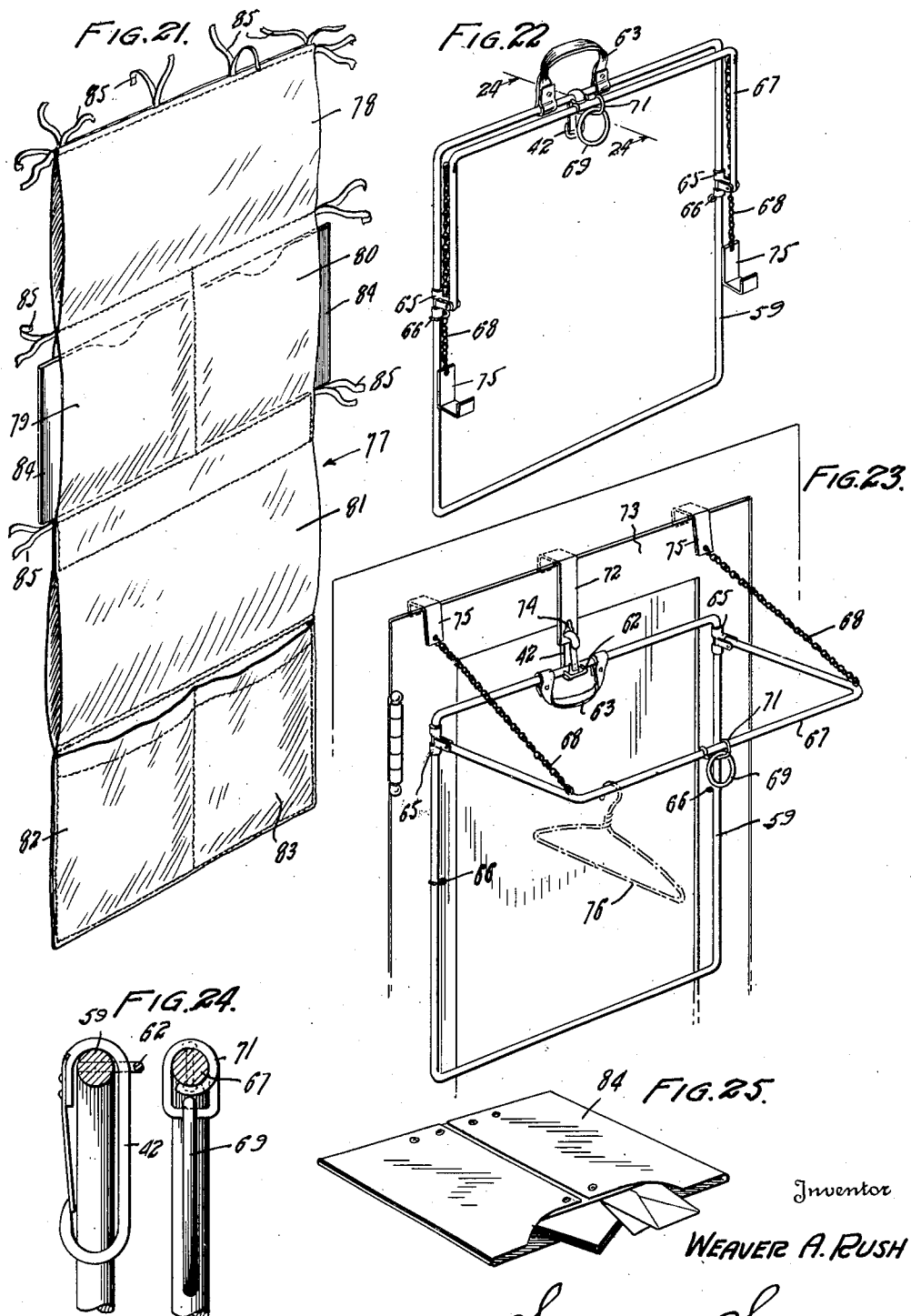

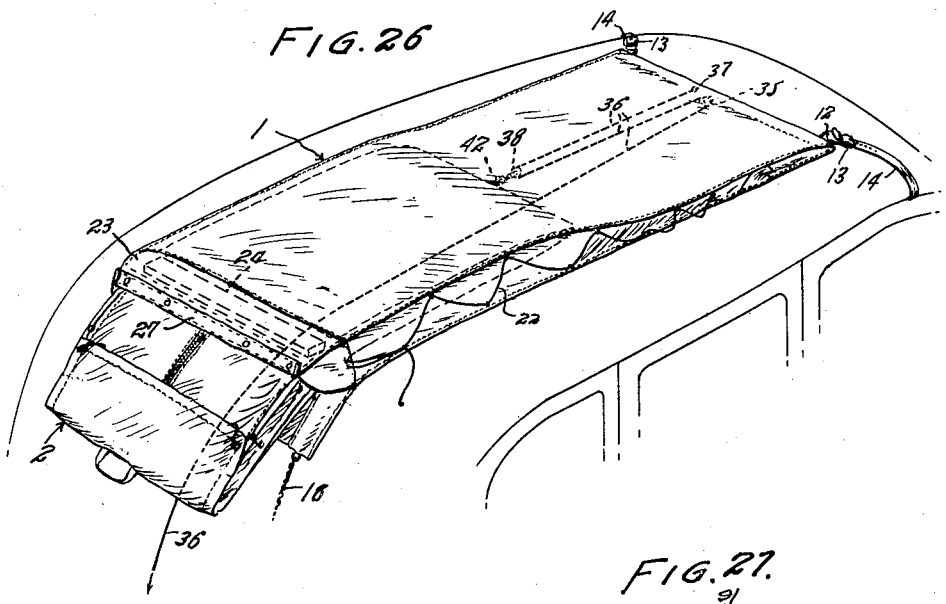
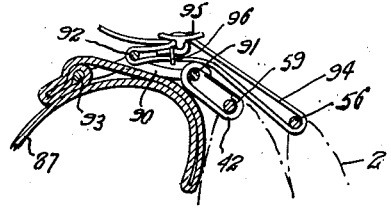
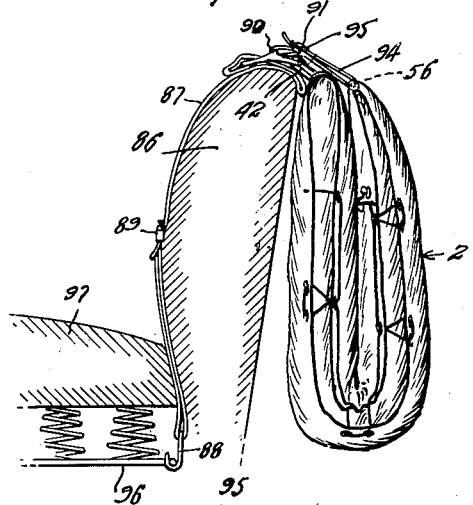
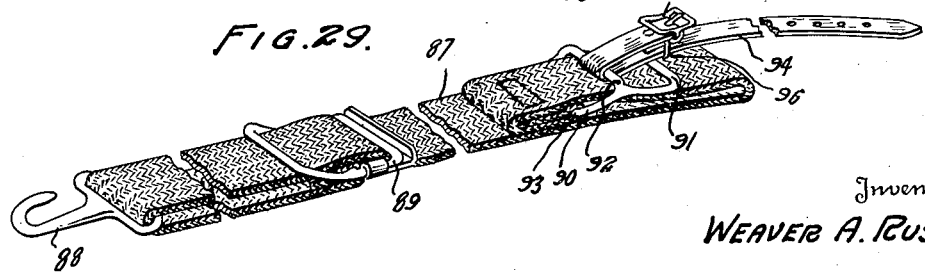

Patented Apr. 9, 1940

2,196,341

UNITED STATES PATENT OFFICE 2,196,341

TRAVELING BAG FOR AUTOMOBILES

Weaver A. Rush, Beatrice, Nebr.

Application May 20, 1935, Serial No. 22,448
Renewed July 7, 1939

1 Claim. (Cl. 224—29)

This invention relates to containers, and more particularly has special reference to a receptacle for clothes, and adapted to be used upon the top of an automobile.

The device described and claimed herein is generally similar to the invention shown in my copending applications Ser. Nos. 527,739 and 633,528, filed April 4, 1931, and September 16, 1932, respectively, issued as Patents Nos. 2,090,986, Aug. 24, 1937, and 2,105,989, Jan. 18, 1938, respectively. However, there are certain improvements incorporated in the present invention which add materially to the advantages of my prior devices.

More specifically, the present invention is constructed in accordance with the theory now obtaining in the streamlining of automobiles, provides means for more readily attaching to or removing from the automobile the outer or "semi-permanent" bag, and incorporates numerous improvements in the inner bag, and particularly extends the scope of use of such inner bag.

An object of this invention is to provide a bag which may be readily attached to the top of an automobile without impairing the appearance of the car and which is so constructed that wind resistance is reduced to a minimum.

Another object of this invention is to provide a bag particularly adapted for the carrying of garments and wearing apparel, and access to which may be readily had.

Yet another object of this invention is to associate with such garment bag, means for readily supporting in a conventional manner a large number of garments in a room and independently of the bag.

A still further object of this invention is to provide means for transporting the garment bag and its contents by supporting the same from the rear of the front seat of an automobile.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claim.

To facilitate an adequate comprehension of my invention, there is shown in the accompanying drawings one specific embodiment thereof, it of course being understood that various modifications may be made therein without exceeding the scope of the appended claim.

In these drawings, in which similar numerals indicate corresponding parts,

Figure 1 is a side elevation of an automobile equipped with my invention;

Figure 2 is a top plan view of the device shown in Figure 1;

Figure 3 is a rear elevation of the device shown in Figures 1 and 2;

Figure 4 is a detail view of apparatus illustrating the method of securing the front part of the bag to an automobile;

Figure 5 is a detail view of one specific form of fastening means;

Figure 6 is a view partly in section of the assembled fastening means;

Figure 7 is a detail view in perspective, partly broken away, of the outer bag;

Figure 8 is a detail view of the head block used in the outer bag;

Figure 9 is a sectional view along line 9—9 of Figure 7, looking in the direction of the arrows;

Figure 10 is a sectional view along line 10—10 of Figure 7, looking in the direction of the arrows;

Figure 11 is a sectional view along line 11—11 of Figure 7, looking in the direction of the arrows;

Figure 12 is a view somewhat similar to Figure 11, but showing the inner bag positioned within the outer bag, and showing the closure member in closed position;

Figure 13 is a view along line 13—13 of Figure 7, looking in the direction of the arrows;

Figure 14 is a view along the line 14—14 of Figure 7, looking in the direction of the arrows;

Figure 15 is a view of the inner bag in a folded position;

Figure 16 is a top plan view of the inner bag in extended position;

Figure 17 is a side view of the inner bag in extended position;

Figure 18 is a top plan view of the inner bag, with one half of the top thrown back;

Figure 19 is a sectional view along line 19—19 of Figure 16;

Figure 20 is a detail view of the locking means for the wall-collapsing cord;

Figure 21 is a view in perspective of the inner apron-like member;

Figure 22 is a view of the clothes support removed from the inner bag and in folded position;

Figure 23 is a view of the clothes support in operative position and assembled upon the door;

Figure 24 is a sectional view along line 24—24 of Figure 22, looking in the direction of the arrows;

Figure 25 is a detail perspective view of the stiffening means for the apron-like member;

Figure 26 shows apparatus illustrating the method of inserting the inner bag within the outer bag;

Figure 27 shows the inner bag supported upon the rear of the front seat of an automobile;

Figure 28 is a detail view partly in section and partly in elevation, showing apparatus illustrating the method of securing the inner bag to the supporting strap;

Figure 29 is a view in perspective, and partly broken away, of the supporting strap.

As best shown in Figures 1 and 2, my invention in general comprises an outer bag 1 and an inner bag insertable therein and designated by dotted lines 2 of Figure 2.

While various materials may be used in the construction of these two bags, I prefer a relatively heavy weight, durable and weatherproof material, such as heavy canvas, for the outer bag; while the inner bag may be formed of a lighter weight material.

The advantages of such an arrangement are of course obvious, particularly when used for the carrying of garments.

The provision of two bags not only insures greater protection for the garments against dirt, moisture, and dust, but of course facilitates the transporting of such articles with a minimum of inconvenience. Likewise, the provision of the inner bag permits of the semi-permanent attachment of the outer bag to the automobile, thus obviating the attachment and removal of such outer bag each time an extended stop is made. The inner bag is of particular value in that it prevents wear and possible tearing, as well as soiling, of the garments upon insertion or removal from the outer bag. Furthermore, the use of the inner bag facilitates the insertion, and particularly the removal, of clothes from the outer bag, and minimizes the possibility of creasing or mussing the clothes.

As best shown in Figure 7, the outer bag is made up of a base 3 adapted to fit snugly upon the top of an automobile and of a length almost equal to that of the automobile top. The length and the width also may be varied to fit the exigencies of any given situation, such as the size of the car, the volume of the contents of the bag, and similar considerations. Stitched to the base are side walls 4 which are of a relatively flexible material so that they may be readily collapsed. Stitched to the upper edge of the side walls is a top 5 which may be a continuation of the base 3, as shown in Figures 9 and 10.

The side walls 4 are preferably of uniform height throughout the major part of the length, but at the forward end these walls decrease in height toward the base so that the front part of the top is sloping as at 6 to thereby reduce the wind resistance offered by the bag.

A head block 7, preferably tubular and metallic, is located in the forward end of the bag and secured in position by means of stitching 8 through the top and bottom, as shown in Fig. 10. At the ends of the head block are forwardly extending loops 9 which extend through the head block and have one end looped at the rear as at 11.

Secured to each loop 9 is a short strap 12, carrying a buckle 13 at its free end. An extension strap 14 may be adjustably secured in each buckle 13, and passes around the top side of the car and through the door, as shown in Figure 4. The extension strap 14 may be made of either webbed material or leather and is preferably of a thickness, particularly at the point where it passes through the door, so that the door may be closed thereover.

As shown in Figures 4 through 6, immediately over the doorway at the point where the strap 14 enters, I provide a notched stud 15 which may be screwed to the interior of the car without in any way marring the exterior appearance of the car. A clip 16 is secured to the free end of the extension strap 14 and is adapted to fit in the notch of the stud. As best shown in Figure 6, the notch in the stud and the engaging edge of the clip are sharpened to provide a more secure engagement.

As best shown in Figures 7 and 8, a rope or cable 17 is secured to each loop 11 of the head block. The ropes 17 extend the length of the base 3 and at the sides thereof, and serve to reinforce the base and to take the strain of fastening the bag to the top of the automobile.

At their rear ends, the ropes 17 are looped, and there is secured to each rope a chain 18 having a spring 19 interposed in its length. The lower end of each chain may be passed around the bumper 20 of the automobile and appropriately secured to anchor the rear of the outer bag. The provisions of springs in the chains 18 insure a certain resiliency, but at the same time serve in conjunction with the straps 14 to securely hold the outer bag to the top of the car.

Suitable grommets 21 are secured to the side edges of the top and the lower part of the side walls in a staggered relationship. As best shown in Figure 14, the lower grommets are carried by clips 21—a, which pass through the side walls and through the rope 17, thus serving not only to strengthen the securing means for the grommets, but also holding the rope 17 in place.

A cord 22 is secured to the forward grommet 21, and passes through the others to afford a means for collapsing the side walls and top so that the outer bag fits snugly against the inner bag 2. The collapsibility of the side walls, in conjunction with the sloping forward part of the top, not only lowers the wind resistance of the device, but also serves to prevent flapping and bellowing of the outer bag when the car is in motion.

As best shown in Figure 7, the opening for the outer bag is at the rear, and I provide a closure member 23 therefor. As best shown in Figure 11, the closure member may be a continuation of the top, and is provided with a reinforcing slat 24 which is contained within a pocket formed by the top and an auxiliary strip of material 25 sewn thereto. The top 5 may be bent as at 26 along the line of the forward stitching between the top and strip 25 to form in effect a hinge along which the closure 23 may be swung open or closed.

It will also be noted that the closure 23 is b and stitched as at 26' so that a portion 27 of t... closure is normally disposed at an angle to the remainder of the closure, for a purpose to be described. The angularly disposed portion 27 carries a series of spaced metallic eyes 28 forming a part of a snap fastener arrangement. The base 3 carries a corresponding series of studs 29 which are adapted to cooperate with the eyes 28 to secure the closure in closed position.

As best shown in Figure 13, the two central studs 29—a are mounted in buffer members secured to the base 3. These buffer members are made up of several layers of material 31 which carry a tubular cord or cable 32 on opposite sides of the studs. It will be noted that the tubular members 32 and their enclosing layers of material will extend slightly above the top of the stud 29—a and are sufficiently close thereto so that they afford a protection against tearing of the inner bag when it passes over the studs 29—a. In the absence of such buffers, the studs are liable to catch in the base of the inner bag and either tear the inner bag or be torn from their fastening. It will be noted that it is necessary to provide these buffers to only the two central studs inasmuch as these are the only two studs which are normally contacted by the improved bag. As shown in Figure 17, the inner bag is provided with collapsible side walls which result in a cupping of the base, and therefore the side portions of the base pass freely above the outer studs 29.

A grommet 33 is secured to each side of the closure member 23 slightly below the slat 24. It will be observed that the cord 22 passes through the rearmost grommet 21—b, thence through the grommet 33, and the free end then passes again through grommet 21—b. Consequently, when the free end of the cord is pulled, it causes not only a collapsing of the side walls of the outer bag, but may also draw inwardly the closure member, as best shown in Fig. 12, to thereby further prevent any longitudinal displacement of the inner bag.

The primary purpose of the slat 24, however, is to facilitate insertion of bag 2 within the outer bag. The slat serves in effect as a guide, which prevents a folding-in of the closure 23 when the inner bag is inserted. In lieu of the slat 24, a rod may be merely sewed into the closure at approximately the fold 26. It will be appreciated that both the slat and the rod extend substantially the width of the outer bag and serve to maintain the top thereof planular, rather than allowing it to fold and thereby be drawn inwardly of the outer bag when the inner bag is inserted.

It will be noted from Fig. 7 that the closure 23 is provided with depending wings 34 which, in association with the closure, insure a tight closing of the outer bag.

The head block 7 carries a centrally disposed pulley 35 around which passes a cord 36. One end of the cord 36 is attached to a suitable hook 37 on the head block, and the cord then passes through a second pulley 38, thence around pulley 35, and its free end 39 normally falls outside of the rear of the bag. The pulley 38 is provided with a hook 41 which is engaged by a snap 42 of the inner bag. It will be seen, therefore, that the inner bag may be readily inserted in the outer bag with a minimum of effort, as disclosed broadly in my above-mentioned prior applications.

It will of course be appreciated that the stitching 8, which serves to hold the head block in the forward end of the bag, is omitted adjacent the pulley 35 and hook 37, as best shown in Figure 9.

From the foregoing it will be noted that the outer bag and the method of securing the same to the automobile top, constitutes an improvement over the outer bag shown in my prior applications, aforesaid, and presents numerous advantages over receptacles heretofore known, particularly as applied to the use of the same on the top of the automobile. Likewise, the inner bag disclosed herein is of such a construction that the improvements incorporated therein are of considerable advantage when the inner bag is used alone and when used in conjunction with the outer bag above described.

Referring to Figures 16 and 17, it will be noted that the inner bag is made up of a base 43, collapsible side walls 44 and a cover 45. The base 43 is stitched to the side walls, and at its upper end is stitched to the cover or the cover may be formed by merely a continuation of the base. A suitable reinforcement 46 is imposed upon the base and cover at their upper ends to afford additional protection.

The cover is stitched to the side walls, and is slit longitudinally and in the center so as to form two sections 45—a and 45—b. The free edges are preferably joined by means of a hookless or "zipper" fastener 47. This fastener not only facilitates opening of the bag but also presents a surface which is substantially flush with the top of the bag and therefore there are no protuberances to catch on the outer bag when inserted or removed therefrom. As best shown in Figure 18, when the zipper has been unfastened one or the other of the said sections 45—a or 45—b may be thrown back and over the frame to be described hereinafter to expose the corresponding half of the contents. The base 43 of the inner bag is continued to form a flap 48 which may be folded over the lower half of the cover of the bag. In this connection, it will be noted that the cover, at its lower edge, is not stitched to the base 43, and the closure for this edge is therefore the flap 48.

As best shown in Figure 19, the top and base of the inner bag are so stitched to the side walls as to form overhanging lips 49. A series of grommets 51 are inserted in the overhanging lips. The flap 48 likewise is provided with grommets 52 adjacent its free edge. A cord 53 passes through the grommets 51 and 52, and upon tightening of the cord the side walls are collapsed and the flap 48 securely tied in the closed position. Of course, if the inner bag is well filled, there can be no collapse of the side walls, but in such event, it will be noted that as shown in Fig. 17, the side edges of the bag are bound so that the base and cover of the bag are cupped. As heretofore pointed out, this means that when the inner bag is inserted or removed from the outer bag, the frictional contact of the two bags is limited to their respective centers.

I prefer a spacing of the grommets 51 as shown in Fig. 17; namely, that with certain grommets, such as 51—a, the cord 53 passes twice therethrough. This affords additional friction and tends to prevent slippage of the cord, thereby facilitating the lacing operation and the collapsing of the side walls.

I have provided a novel means of locking the cord 53 taut, as shown in Fig. 20. The free end of the cord, beyond the grommet 52 of flap 48, is inserted in one hole of a button 54, thence through the hole of another button 55, thence through the second hole of button 54 and finally the free end is passed between the two segments of the cord intermediate the two buttons. Therefore, upon tightening of the free end, the cord is securely tied against grommet 52 to thereby hold the same in position.

At the intersection of the base 43 and flap 48, I stitch in a rod 56. To the rod 56 there is secured a cloth or leather handle 57. The base and flap are also cut away as at 58 for a purpose to be hereinafter referred to.

As indicated in Fig. 18, and as shown more fully in Figs. 22 through 24, there is inserted in the top of the inner bag a frame. This frame not only serves to strengthen and maintain the shape of the inner bag, but is particularly useful as a garment support independently of the inner bag.

The frame is made up preferably of a tubular piece of metal bent to form a rectangle 59. The width of this rectangle is substantially the interior width of the inner bag and its length is preferably half the length of the inner bag. By having the length less than half that of the inner bag, the latter may be folded as shown in Fig. 14. As will be later adverted to, this not only facilitates the manual carrying of the inner bag, but also renders it possible to transport the inner bag within the vehicle and from the rear of the front seat.

A spring clasp 42 is swingably mounted on the top of the rectangle 59 and within the guide member 62 which maintains it at all times at the center of the top. Likewise a flexible handle 63 is secured to the top, and this flexible handle may extend through a cut-away section 64 of the reinforcement 46, base 43 and cover 45 of the inner bag. Therefore, when it is desired to carry the inner bag in a folded position, as shown in Figure 15, the two handles 63 and 57 may be readily grasped. A guide member 65 is slidable on the top of each side of the rectangular frame 59, and stops 66 are inserted in each side to limit the downward movement of the guides. An angular arm 67 has its ends hingedly mounted in the guides 65, and chains 68 are secured to the arm adjacent its angles. A ring 69 is carried by a hook 71 loosely and spirally mounted on the arm 67. Ring 69 may therefore swing through an arc of 90° so as to lie either parallel or perpendicular to the center portion of the arm 67.

I provide a metal strap 72 angularly bent so as to fit over the top of a member such as a door 73, as shown in Fig. 23. A hole 74 is drilled near the lower end of the strap and the spring clasp 42 may be snapped through said hole. The strap 72 and snap 42, therefore, are adapted to support the frame. Two other angular straps 75 are attached to the chain 68 and likewise are adapted to fit over the top of the door to hold the arm 67 in an extended position.

It will therefore be seen that the frame, when folded as in Figure 22, may be readily inserted within the inner bag forming a support for such inner bag and maintaining its shape. On the other hand, the frame may be assembled upon a door or other suitable support, such as shown in Fig. 23, and when so assembled, it is adapted to carry a large number of clothes hangers 76. As shown in Figure 18, the ring 69 supports the clothes hangers and garments when the frame is inserted in the inner bag.

As best shown in Figures 18 and 21, I prefer to include in my invention an apron designated generally 77. The apron is preferably made up of two co-extensive pieces of material suitably stitched to form a series of pockets 78, 79, 80, 81, 82 and 83. Of course, a different number, or a different arrangement of pockets may be provided if desired. These pockets, of course, may receive articles which it is desired to carry, such as shirts, handkerchiefs, ties, and similar objects, and pockets 82 and 83 are particularly adapted for carrying relatively bulky articles, such as shoes, for instance. The articles carried in pockets 78, 79, 80 and 81 may be first placed in envelopes or equivalent containers. Such a container 84 is shown in Fig. 25, in which there is disclosed its use for the carrying of stationery. Of course, other objects may be substituted therefor, such as handkerchiefs, and in the case of an envelope for pockets 78 and 81, shirts and other larger articles may be inserted.

These envelopes are preferably formed of relatively stiff cardboard or similar material and therefore, in addition to serving as an additional protection for their contents, they also serve as stiffeners. This, of course, prevents wrinkling of the clothes carried by the inner bag.

A series of ties 85 are spaced along the edges of the top of the apron 77 by which the apron may be secured to the frame 59. As shown in Fig. 18, when so arranged upon the frame, the apron 77 falls substantially the length of the inner bag and serves as an additional protection for its contents, particularly useful when carrying fragile garments, such as women's evening gowns.

In Fig. 26 there is depicted the ease with which the inner bag may be inserted in the outer bag. The spring clasp 42 extends through the cut-away section 64, and is snapped to the hook 41 of pulley 38. It is then merely necessary to pull upon the free end of rope 36, whereupon the inner bag is drawn into the outer bag.

As pointed out above, the slat 24, or the rod which may be substituted therefor, serves to prevent any folding in of the closure 23 or the wings 34. Also, it is to be noted that the base 3 extends rearwardly of the closure 23 to thereby prevent contact between the roof of the automobile and the inner bag.

When it is desired to remove the outer bag, the handle 57 in the lower end of the inner bag is grasped and pulled outwardly. As mentioned heretofore, the inner bag and outer bag cooperate in a novel manner. The inner bag is so shaped with its collapsible walls that there is a minimum frictional engagement between the two bags, the provision of a hookless fastener on the inner bag obviates the possibility of the bag catching on the outer bag; and the buffer 31 protects the inner bag from getting caught on the studs 29—a.

Of course, by carrying the bag on the top of the automobile, the entire interior is left for the use of the occupants. However, and notwithstanding the protection afforded the garments when carried on the top, and notwithstanding the ease with which the inner bag may be inserted in the outer bag, it is sometimes desirable to carry the inner bag inside of the vehicle. For the purpose of accomplishing this, I have provided simple means for holding the inner bag in such a way that a minimum of room is taken up.

As clearly shown in Fig. 15, the inner bag may be readily folded upon itself whereby it assumes the shape of a carpet bag. When so folded, it may be affixed to the rear of a front seat 86 of an automobile by means of the strap arrangement shown in Figs. 27 through 29. This arrangement comprises a strap 87, preferably of web construction, provided at one end with a hook 88. The hook 88 is secured to the strap by folding the strap back upon itself and providing the free end with a conventional adjustable buckle 89. The position of the buckle 89, of course, determines the effective length of the strap.

The opposite end of the strap is folded upon itself several times to form a looped holder for a buckle 90, as best shown in Fig. 28. The buckle is provided with three engaging arms 91, 92, and 93. The arm 93 passes through the looped portion of the strap, as above indicated, the arm 92 carries a strap 94, and the arm 91 is engaged by the spring clasp 42 of the frame.

The strap 94 carries a buckle 95 provided with a band 96 surrounding the opposite portion of the strap. This strap passes through cut-away portion 58 of the inner bag, around rod 56, thence around band 96 and back around buckle 95. It will be seen that both of the free ends of the inner bag are secured to buckle 90, and the provision of strap 94 permits the inner bag to hang vertically at the back of the front seat. It is also to be noted that buckle 90 is not positioned at the end of strap 86 and that consequently there is an overrunning portion of the strap which extends over the top of the seat a slight ways down the rear. It is against this portion that the inner bag rests, thus tending to maintain the inner bag removed from the rear surface of the seat and thereby preventing any wear.

As clearly shown in Figure 27, the strap 87 conforms to the contour of the seat and hook 88 is secured to the base 96 of the spring frame. The seat cushion 97, of course, is in no wise disturbed in view of the relative thinness of the strap 87.

It will be observed from the foregoing that I have provided an improved receptacle that is particularly useful for the carrying of clothes and similar articles when traveling by automobile. As stated, the outer bag may be retained on the top of the automobile during the entire trip and the inner bag may be readily removed as occasion demands. The inner bag provides a protective covering, not only when in transit, but when the clothes are in a room. Likewise, the frame 59 makes a particularly desirable clothes support, especially if there is no clothes closet available. The manipulation of the several elements of my invention may be readily accomplished for the desired purpose, and the entire outfit is relatively inexpensive to manufacture.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claim.

I claim:

In combination with an automobile having a top and a door below the top, a receptacle adapted to be positioned on the top of said automobile, means for securing the rear of the receptacle at the rear of the automobile top, a strap extending from the front of the receptacle through the door of the automobile, and means mounted on the automobile inside and above the door to which the strap is adapted to be secured.

WEAVER A. RUSH.